US008687772B2

(12) United States Patent
Forsee et al.

(10) Patent No.: US 8,687,772 B2
(45) Date of Patent: Apr. 1, 2014

(54) GLOBAL TREE RULES FOR AN INTERACTIVE VOICE RESPONSE SYSTEM

(75) Inventors: Daniel Forsee, Dover, DE (US); Ethan Fletcher, Wilmington, DE (US); Kyle Tobin, Middletown, DE (US); Robert M. Casas, Fairless Hills, PA (US)

(73) Assignee: Bank of America Corporation, Charlotte, NC (US)

( * ) Notice: Subject to any disclaimer, the term of this patent is extended or adjusted under 35 U.S.C. 154(b) by 127 days.

(21) Appl. No.: 13/346,855

(22) Filed: Jan. 10, 2012

(65) Prior Publication Data

US 2013/0177144 A1    Jul. 11, 2013

(51) Int. Cl.
*H04M 1/64* (2006.01)

(52) U.S. Cl.
USPC .......................................... 379/72; 379/88.18

(58) Field of Classification Search
USPC .................. 379/265.01–266.1, 72, 88.18
See application file for complete search history.

(56) References Cited

U.S. PATENT DOCUMENTS

| 5,914,712 | A  | * | 6/1999  | Sartain et al. ..................... 725/9 |
| 6,118,866 | A  | * | 9/2000  | Shtivelman .................. 379/309 |
| 6,914,966 | B2 | * | 7/2005  | Virzi et al. ................. 379/88.02 |
| 2008/0240374 | A1 | * | 10/2008 | Conway et al. ............. 379/67.1 |

* cited by examiner

*Primary Examiner* — Simon Sing
(74) *Attorney, Agent, or Firm* — Banner & Witcoff, Ltd.; Michael A. Springs

(57) ABSTRACT

Methods, computer readable media, and apparatuses for managing calls in an interactive voice response system are presented. According to one or more aspects, a call from a user or customer is received by an interactive voice response system. The interactive voice response system retrieves user information based on user credentials. An interactive voice response program analyzes the user information and determines a first business rule to retrieve. A decision tree application retrieves the first business rule and analyzes the information within the first business rule. The decision tree application may retrieve one or more additional business rules based on a decision from the first business rule. The decision tree application makes a decision based on the information within the business rules and sends the decision to the interactive voice response application. Based on the decision, the interactive voice response application manages the call in the interactive voice response system.

18 Claims, 6 Drawing Sheets

```
// File = globalCashRule
// Global business rule to be accessed by any tree
  needing to check cash eligibility criteria
//////////////////////////////
START:
        If (acct-closed = "Y")               ——— 420
        {
                return 'FAIL';   ——— 425
        }
        If (current-balance-over-limit = "Y")  ——— 421
        {
                return 'FAIL';   ——— 425
        }
        If (line-of-business-cash-excluded = "Y")  ——— 422
        {
                return 'FAIL';   ——— 425
        }
        If (delayed = "Y")  ——— 423
        {
                return 'FAIL';   ——— 425
        }
        return 'cash-eligible';   ——— 424
END:
        exit
```
— 230

Fig. 4b

```
// File = menutree0001
// Add options to play back to Caller in this
  menu
//////////////////////////////
START:
        ExecuteRule (globalCashRule);   ——— 410
        If (result = "cash-eligible")
        {
                AddOption(cash-option)   ——— 411
        }
412 ——— AddOption(payment-info-option)
413 ——— AddOption(return-to-main-option)
414 ——— AddOption(repeat-option)
END:
        exit
```
— 401

Fig. 4a

```
// File = menutree0099
// Add options to play back to Caller in this menu
/////////////////////////////
START:
       If issuer = 55          ─── 430
       {
                AddOption(special-issuer-message)   ─── 431
       }
       ExecuteRule (globalCashRule);   ─── 432
       If (result = "cash-eligible")
       {
                AddOption(balance-transfer-offer)   ─── 433
       }
       AddOption(change-rates-offer)           ─── 434
       AddOption(return-to-main-option)        ─── 435
       AddOption(repeat-option)                ─── 436

END:   exit
```
─── 403

Fig. 4c

GLOBAL TREE RULES FOR AN INTERACTIVE VOICE RESPONSE SYSTEM

TECHNICAL FIELD

One or more aspects of the disclosure generally relate to computing devices, computing systems, and computer software. In particular, one or more aspects of the disclosure generally relate to computing devices, computing systems, and computer software that may be used by an organization, such as a financial institution, or other entity to manage calls in an interactive voice response system.

BACKGROUND

Interactive voice response systems are utilized to manage calls from customers of a business, such as a financial institution. Customers may call the business for many different options. For example, when calling a financial institution, a customer may call to retrieve a balance for an account, talk to a customer representative, report unauthorized charges, or for other various reasons. The calls to an interactive voice response system must be managed within the system. Aspects of the disclosure provide a more efficient way of managing calls within an interactive voice response system.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for managing calls in an interactive voice response system. For example, an organization, such as a financial institution, may utilize an interactive voice response to handle calls from its customers. By implementing one or more aspects of the disclosure, an organization, such as a financial institution, may be able to efficiently manage calls in an interactive voice response system. In particular, rules may be set up and accessed by the interactive voice response system to enable the interactive voice response system to route calls, prioritize calls, and play specific menus to the customers. The rules may be selected by the interactive voice response system based on the information relating to the customer.

According to one or more aspects, an interactive voice response (IVR) system receives a call from a customer or user. An IVR application communicates with the user and prompts the user to enter credentials or security information to verify the identity of the user. Based on the provided user credentials, the IVR application retrieves stored user information and analyzes the user information. The IVR application then determines a business rule to retrieve. The rule may be based on the retrieved user information. The IVR application sends an instruction to a decision tree application to retrieve the business rule. The decision tree application retrieves the business rule and analyzes the information contained in the business rule. The decision tree application sends a decision to the IVR application and based on that decision, the IVR application manages the user's call.

According to one or more aspects, a plurality of business rules may be retrieved during the user's call to the IVR system. The decision sent to the IVR application may be to retrieve an additional business rule. If an additional business rule is retrieved, the decision tree application analyzes the information contained in the additional business rule and sends another decision to the IVR application to assist the IVR application in managing the user's call.

According to one or more aspects, the IVR may manage the user's call by prioritizing the user's call, routing the user's call to a specific group or a specific person, or may determine a specific menu to play to the customer. In at least one aspect, the menu played to the customer is an interactive menu.

BRIEF DESCRIPTION OF THE DRAWINGS

The present disclosure is illustrated by way of example and not limited in the accompanying figures in which like reference numerals indicate similar elements and in which:

FIG. 4a illustrates an example of an instruction for an application in an interactive voice response system according to one or more illustrative aspects described herein.

FIG. 4b illustrates an example business rule according to one or more illustrative aspects described herein.

FIG. 4c illustrates another example of an instruction for an application in an interactive voice response system according to one or more illustrative aspects described herein.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

Figure 1A:
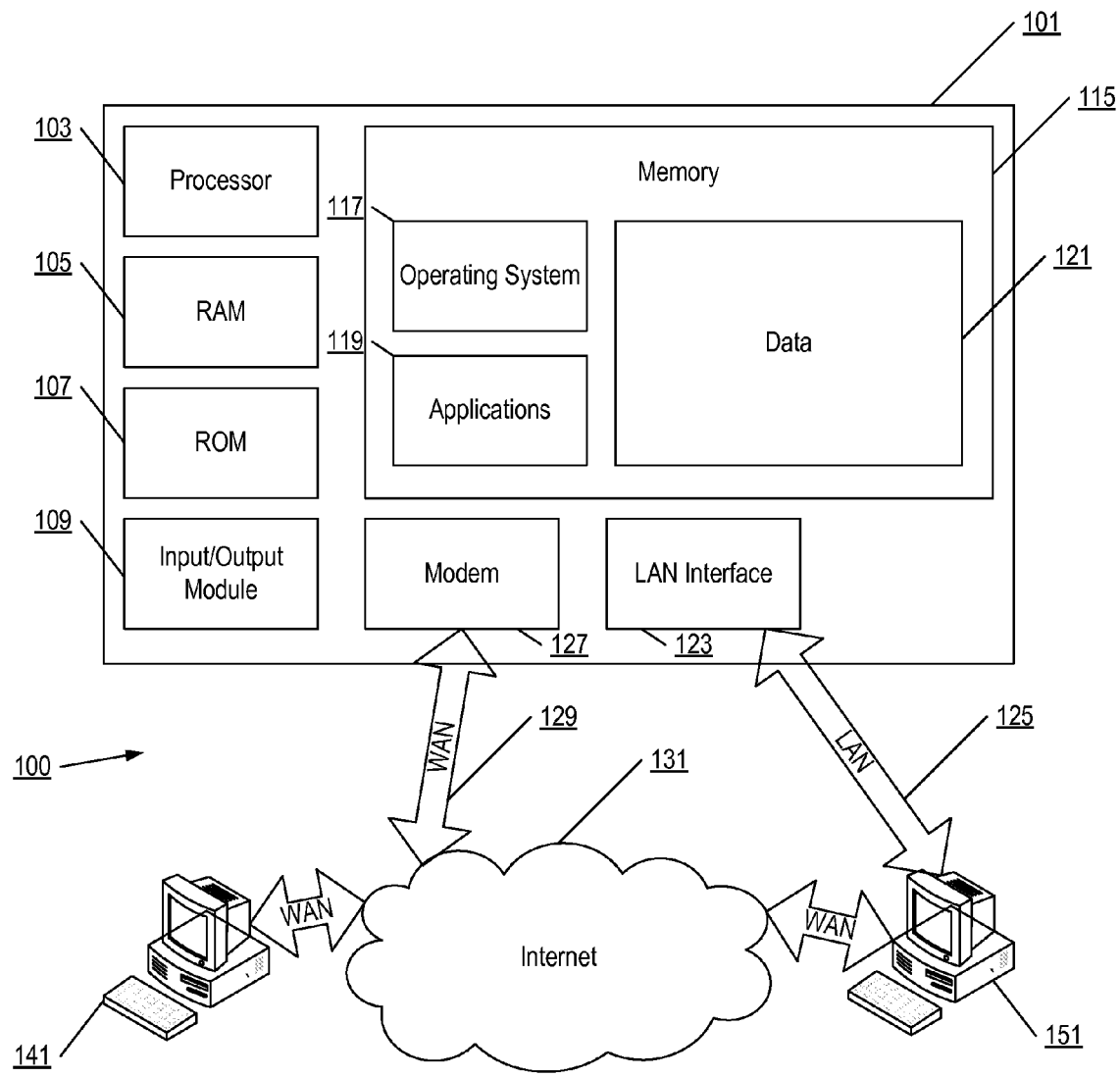
FIG. 1A illustrates an example operating environment in which various aspects of the disclosure may be implemented.

FIG. 1A illustrates an example block diagram of a generic computing device 101 (e.g., a computer server) in an example computing environment 100 that may be used according to one or more illustrative embodiments of the disclosure. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a microphone, mobile device, mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 141 and 151. The terminals 141 and 151 may be personal computers or servers that include many or all of the elements described above with respect to the generic computing device 101. The network connections depicted in FIG. 1A include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Generic computing device 101 and/or terminals 141 or 151 may also be mobile terminals (e.g., mobile phones, smartphones, PDAs, notebooks, and the like) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1B:
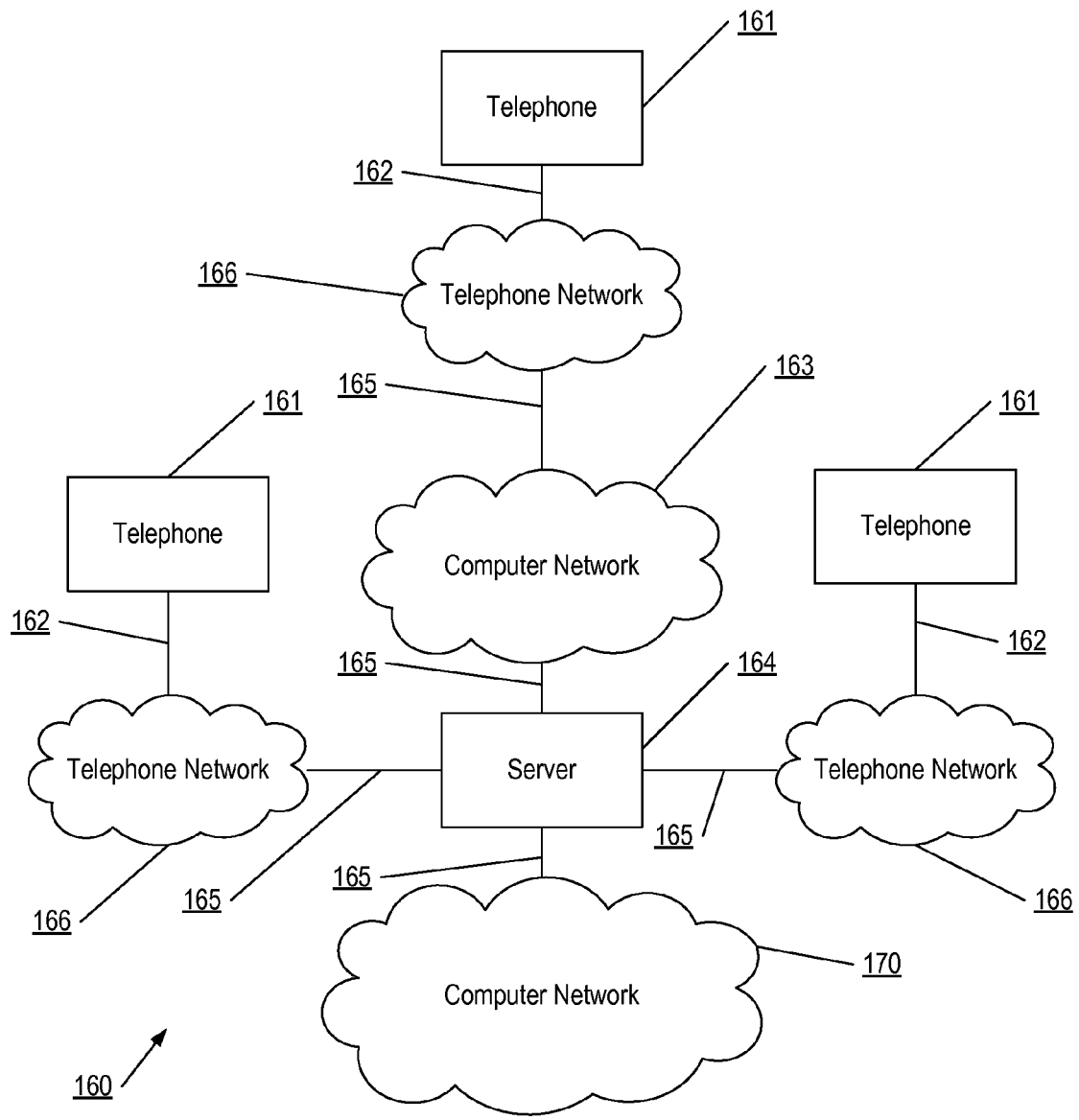
FIG. 1B illustrates another example operating environment in which various aspects of the disclosure may be implemented.

FIG. 1B illustrates another example operating environment in which various aspects of the disclosure may be implemented. As illustrated, system 160 may include one or more telephones 161. Telephones 161 may, in some examples, be connected by one or more communications links 162 to telephone networks 166. The telephone networks 166 may be connected to computer networks 163 via communication links 165. The computer networks 163 may be linked via communications links 165 to server 164. In system 160, server 164 may be any suitable server, processor, computer, or data processing device, or combination of the same. Server 164 may be used to process the instructions received from, and the transactions entered into by, one or more participants.

According to one or more aspects, system 160 may be associated with a financial institution, such as a bank. Various elements may be located within the financial institution and/or may be located remotely from the financial institution. For instance, the telephones 161 may be located remotely from the financial institution and may be located within a user or customer's residence. The telephones 161 may be used, for example, by customers of the financial institution in conducting financial transactions via the telephone network 166. Computer network 163 and computer network 170 may be used by the financial institution to access server 164.

Telephone network 166 may be any suitable telephone network, including regular Public Switched Telephone Network (PSTN) or a Voice over Internet Protocol (VoIP) network. Computer network 163 and computer network 170 may be any suitable computer networks including the Internet, an intranet, a wide-area network (WAN), a local-area network (LAN), a wireless network, a digital subscriber line (DSL) network, a frame relay network, an asynchronous transfer mode network, a virtual private network (VPN), or any combination of any of the same. Communication link 165 may be any communication link suitable for communicating between telephone network 166 and server 164, such as network links, dial-up links, wireless links, hard-wired links, and the like. Communication link 162 may be any suitable communication link between telephone 161 and telephone network 166.

Figure 2:
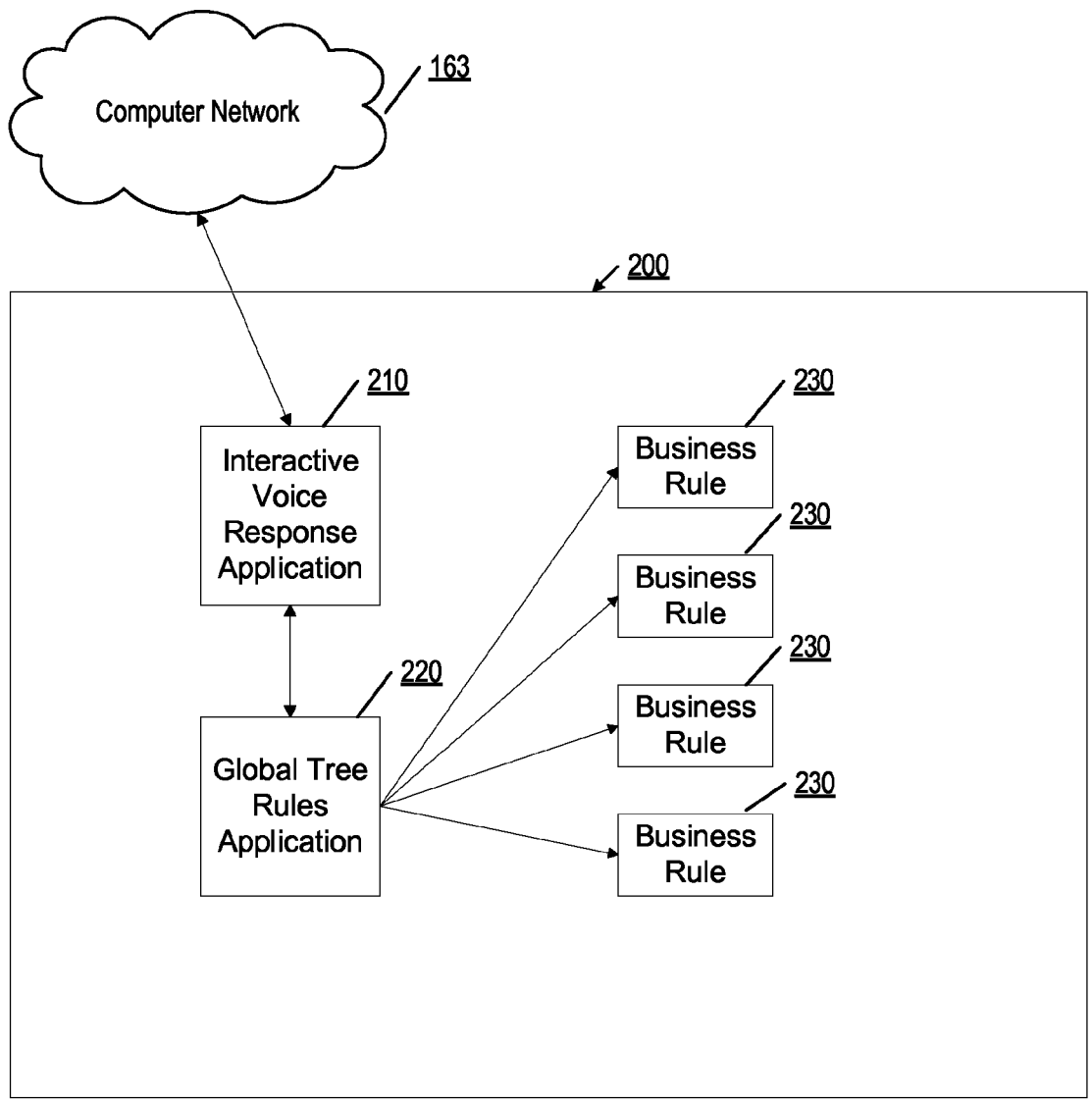
FIG. 2 illustrates an example interactive voice response system according to one or more illustrative aspects described herein.

FIG. 2 illustrates an example interactive voice response (IVR) system 200 according to one or more aspects described herein. The IVR system 200 may contain an interactive voice response (IVR) application 210 and a decision tree application 220. The IVR application 210 and decision tree application 220 may be any suitable software application or program for implementing the features described herein. The IVR application 210 and the decision tree application 220 may be located on a single server or may be located on separate servers that communicate with each other. The IVR application 210 may receive and may send data to a user or a customer through computer network 163 and telephone network 166. The IVR application 210 and the decision tree application 220 may communicate with each other in any suitable manner, such as through computer network 163 or through inter-process communication provided by an operating system.

In at least one embodiment, the decision tree application 220 is configured to access or retrieve business rules 230. The business rules 230, as referred to herein, may be any type of rule or instruction including variables for analyzing information relating to a user of the IVR system 200 and that assists in the management of calls within the IVR system 200. In at least one embodiment, the business rules are separate from the IVR application 210 and the decision tree application 220, The business rules 230 may be located remotely from the IVR application 210 and the decision tree application 220. The business rules 230 may be in any suitable format. For example, the business rules 230 may be data files containing program code. In at least one example, the business rules are .xml files, which contain extensible markup language.

Any number of business rules 230 is contemplated within the scope of the invention. For example, the server 164 may contain one business rule 230 or hundreds of business rules 230. In at least one embodiment, the server 164 contains a plurality of short or mini business rules 230. In this embodiment, due to the small size of the business rule 230 the decision tree application 220 only needs to analyze a small amount of data before making a decision, which decreases the analysis time and also decreases the time a user waits on a call. In at least one embodiment, the each business rule 230 contains different information or different instructions, such that only one business rule 230 needs to be updated if instructions are changed. The business rules 230 may be any length or size and may be stored in any suitable manner. In at least one embodiment, the business rules 230 are all stored in a single, centralized location, such as a database or file management system to increase efficiency in maintaining or updating the business rules 230. In at least one embodiment, each of the business rules 230 has a flag associated with the rule. The flag may be indicative of any appropriate information. For example, the flag may indicate whether or not the business rule 230 has been retrieved and analyzed.

As used herein, an IVR system 200 is a system that allows a software program stored on a computer or server to interact with users or customers of the IVR system 200 through the use of voice and inputs on a communications device. The inputs may be tones generated by pressing numbers on a telephone keypad. The IVR system 200 converts the inputs or recognizes the speech and responds with pre-generated or dynamically generated audio responses.

Figure 3:
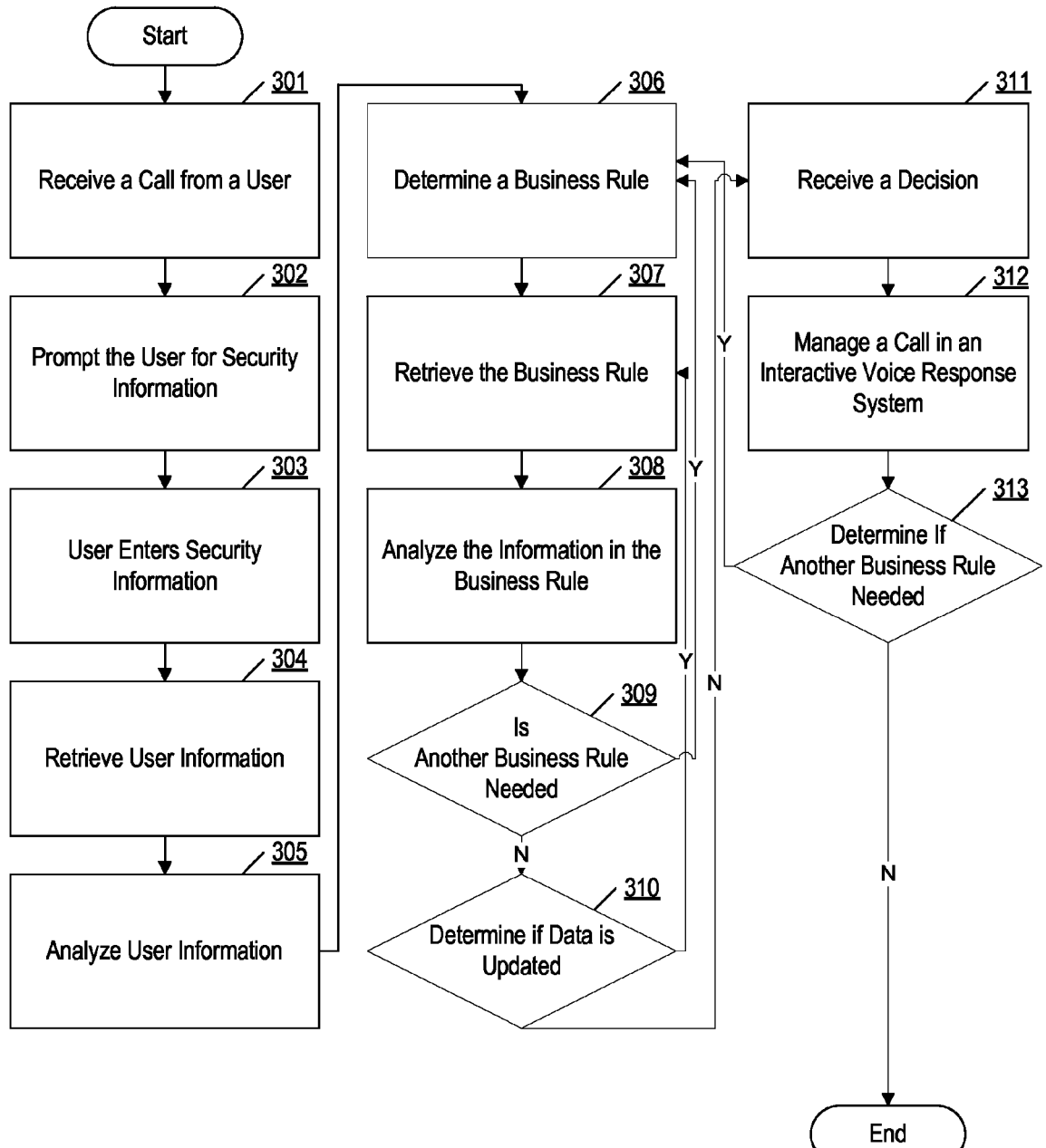
FIG. 3 illustrates an example method of managing calls in an interactive voice response system according to one or more illustrative aspects described herein.

FIG. 3 illustrates an example method of utilizing global tree rules to manage calls within an IVR system 200. According to one or more aspects, any and/or all of the methods described herein may be implemented by software executed on one or more computers, such as the generic computing device 101 of FIG. 1A, and/or by a computing system, such as system 160 of FIG. 1B. In some arrangements, the methods described herein may be performed by and/or in combination with a server (e.g., server 164). Additionally, the methods described herein may be performed in combination with one or more telephones (e.g., telephones 161).

In step 301, a call from a customer or user may be received at an interactive voice response (IVR) system 200. The customer may make the call from any type of voice communication device, including a home telephone, a cellular telephone, a computer, or a smart phone, and the like. In step 302, when the call is received at the IVR System 200, the IVR application 210 in the IVR system 200 prompts the customer for credentials or security information sufficient to verify the identity of the customer. For example, the IVR application 210 may prompt a customer to input identification information such as their social security number, their account number, their birthdate, their mother's maiden name, a phone number, a zip code, a preset security code, and the like. The IVR application 210 may prompt a customer to enter any number of security identifiers to enable the IVR application 210 to accurately identify the customer.

In step 303, in response to the prompt from the IVR application 210, the customer or user enters the requested security information. The customer or user may enter the requested security information by speaking the information or by pressing numbers on a telephone indicative of numbers or letters corresponding to the security information. In step 304, the IVR application 210 receives the security information, and based on the security information, retrieves information about the user. The user information retrieved by the IVR application 210 may include any type of information about a user or a customer, including a user's financial information. For example, the IVR application 210 may retrieve user information such as a Fair Isaac Corporation (FICO) score, transaction history, account balances, preferences, and the like.

In step 305, the IVR application 210 determines which business rule 230 to retrieve. A business rule 230 may be retrieved at any time during a user's call. The business rule 230 may be based off of the user information retrieved in step 304. In step 306, the IVR application 210 determines which business rule 230 to retrieve and instructs the decision tree application 220 to retrieve a specific business rule 230. The determination of which business rule 230 to retrieve may be based on any number of factors. For example, the IVR application 210 may determine a business rule 230 based on a hard coded reference, such as the phone number dialed by the user, the duration of the call, the timing of the call in relation to an event such as a letter from a financial institution or a recent payment, and the like. Alternatively, the business rule 230 may be dynamically selected based on information provided by the user or based on the duration of time a user is on a call. In at least one embodiment, the business rule 230 selected is based on the duration of time the user has been on the call with the IVR system 200. In another embodiment, the business rule 230 is based on the information retrieved by the IVR application 210, such as the user's transaction history, account balance, or preferences.

In step 307, the decision tree application 220 retrieves the business rule 230. The business rule 230 may be retrieved through instructions within the decision tree application 220. For example, as illustrated in FIG. 4a, the decision tree application 220 executes the instructions contained in the data file 401 to retrieve a business rule 230. In this example, the decision tree application 220 executes the instruction 410 to retrieve and execute a business rule 230 entitled "globalCashRule".

In step 308, the decision tree application 220 analyzes the information in the business rule 230 and makes a decision. In at least one embodiment, the decision may be to call another business rule 230. In this embodiment, any of the business rules 230 may be called. In at least one embodiment, a decision to call an additional business rule 230 may be based on updated data, such as updated user information. The decision tree application 220 may analyze the business rule 230 by executing executable program code or by interpreting instructions within a program code. For example, as illustrated in FIG. 4b, the "globalCashRule" business rule 230 is executed by the decision tree application 220 to determine whether the account is closed 420, whether the account has a current balance that exceeds a pre-set limit 421, whether the user is excluded from receiving a cash advance 422, or if the user is delayed in making required payments 423. The decision tree application 220 compares the user's information to the instructions contained in the business rule 230 to make a decision. In this example, if the account is closed, the account has a current balance that exceeds a pre-set limit, the user is excluded from receiving a cash advance, or if the user is delayed in making required payments, the decision tree application 220 issues a decision of "FAIL" 425. If the account is not closed, the account does not have a current balance that exceeds a pre-set limit, the user is not excluded from receiving a cash advance, or if the user is not delayed in making required payments, the decision tree application 220 issues a decision of "cash-eligible" 424.

In step 309, based on the decision in step 308, the decision tree application 220 determines whether or not another business rule 230 is needed. If the IVR application 210 determines that based on the decision received from the decision tree application 220, another business rule 230 is needed, steps 306-309 are repeated until no further business rules 230 are needed. Any number of business rules 230 may be retrieved during a user's call. For example, the decision tree application 220 may retrieve Business Rule A, and after analyzing Business Rule A, the decision tree application 220 may retrieve Business Rule B. After analyzing Business Rule B, the decision tree application 220 may retrieve Business Rule C, and so on, until no further business rules need to be retrieved.

In step 310, the decision tree application 220 determines if data has been updated. The updated data may include any type of updated information, including updated user information and updated information within a business rule 230. For example, a user may make a payment on his or her account during the call to the IVR system 200 to become current on his or her payment schedule, which may change the user information requiring one or more business rules 230 to be re-executed. In another example, variables within a business rule 230, such as menu options, may change and require that the business rule 230 be re-executed. The decision tree application 220 may be notified that the data has been updated or may analyze the data to determine if the data has been updated. If data has been updated, one or more business rules 230 may be re-executed and re-analyzed.

If the data is not updated and if no other business rule is needed, in step 311, the decision tree application 220 sends a decision to the IVR application 210. In step 312, after receiving a decision from the decision tree application 220, the IVR application 210 manages the user's call based on the result of the business rule. The call may be managed in any appropriate manner. For example, a specific menu may be played to the user, the call may be routed based on the user's information, or the call may be prioritized, such that the call is moved ahead of other calls within a queue in the IVR system 200, based on the user's information. For example, as illustrated in FIG. 4a, if the decision tree application 220 sends the "cash-eligible" decision 424, the IVR application 210 creates a menu played to the user. The menu may be created by adding menu options. Any number of options may be included in the menu. In one example, as illustrated in FIG. 4a, the menu may include the options to retrieve cash 411, to make a payment 412, to return to the main menu 413, and to repeat the previous options 414.

In step 313, the IVR application 210 may determine whether or not another business rule 230 is needed prior to the end of the user's call. If another business rule 230 is needed, then steps 306-312 are repeated. The additional business rule 230 may be needed for any number of factors or combination of factors. The additional business rule 230 may be any appropriate business rule 230, including a business rule 230 that was previously executed during the user's call. In at least one embodiment, another business rule 230 is needed based on the elapsed time the user is on the call with the IVR system 200. In an alternative embodiment, another business rule 230 is needed based on the location of an issuer of a financial institution card, such as a credit or debit card. The IVR application 210 may instruct the decision tree application 220 to call an additional business rule 230. The additional business rule 230 may be retrieved through instructions within the decision tree application 220.

For example, as illustrated in FIG. 4c, the decision tree application 220 executes the instructions contained in data file 403 and determines the location of the issuer 430 of the user's financial institution card. In this example, the decision tree application 220 determines the issuer is 55, which corresponds to StateX. The decision tree application 220 also executes the instruction 432 to retrieve and execute the business rule 230 entitled "globalCashRule", which was previously executed during the user's call. The decision tree application 220 re-executes the globalCashRule business rule 230 to determine whether the account is closed 420, whether the account has a current balance that exceeds a pre-set limit 421, whether the user is excluded from receiving a cash advance 422, or if the user is delayed in making required payments 423. The decision tree application 220 compares the user's information to the instructions contained in the business rule 230 to make a decision. In this example, if the account is closed, the account has a current balance that exceeds a pre-set limit, the user is excluded from receiving a cash advance, or if the user is delayed in making required payments, the decision tree application 220 issues a decision of "FAIL" 425. If the account is not closed, the account does not have a current balance that exceeds a pre-set limit, the user is not excluded from receiving a cash advance, or if the user is not delayed in making required payments, the decision tree application 220 issues a decision of "cash-eligible" 424.

In this example, if the decision tree application 220 sends the "cash-eligible" decision 424, the IVR application 210 creates a menu played to the user. The menu may be created by adding menu options. Any number of options may be included in the menu. As illustrated in FIG. 4c, the menu may include the options to add a special message 431 based on the location of the issuer 430, to transfer a balance 433, to change the interest rate 434, to return to the main menu 435, and to repeat the previous options 436.

The menu options played to the user may be any appropriate response to the user based on the user's information retrieved in step 304. For example, the menu options may be based on the time of the month that the user is calling in or recent transactions in the user's account. The menu may be related to cash options, such as transferring a balance to another account or increasing the balance of an account. Additionally, the menu options may be related to products available to the user.

In at least one embodiment, the call is routed to a specific business area based on the user's information retrieved in step 304. For example, a call may be routed to a sales department due to the balance of a user's account(s). Calls may also be routed to departments such as customer service, an unauthorized charges department, a collections department, or a claims department. Additionally, a call may be routed to a specific person within the department. For example, a call may be routed to a new associate, a senior associate, or a sales associate having a high rate of sales.

Alternatively, a call may be prioritized, or placed in front of other calls within a queue, based on some predefined criteria, e.g., the user's information and/or the frequency of the user's calls to the IVR system 200. For example, a user's call may be prioritized over other calls if the user's account is over a specific limit or the user is delayed in making payments and the user rarely calls into the IVR system 200. Additionally, a call relating to an unauthorized charge may be prioritized over a call requesting a balance inquiry. Additionally, IVR application may determine or prioritize the wait time before a user's call is answered by an associate.

As an illustrative example of the method illustrated in FIG. 3 and in accordance with aspects described herein, a customer of a financial institution calls into the financial institution's IVR system. The IVR application 210 interacts with the customer and prompts the customer to enter a preset security code. The customer enters the preset security code and the customer's identity is verified. The IVR application 210 retrieves information about the user from a database within the financial institution. The IVR application 210 analyzes the user information and passes the user information to the decision tree application 220. The IVR application 210 instructs the decision tree application 220 to retrieve business rule A. The decision tree application 220 retrieves business rule A, analyzes the data in business rule A and determines that a letter was sent to the customer in the last week. Based on the response that a letter was recently sent, decision tree application 220 retrieves business rule B and analyzes the data in business rule B. After analyzing the information in business rule B, the decision tree application determines that the letter was regarding unauthorized charges and sends a decision to the IVR application 210 to route the customer's call to the unauthorized charges department. The IVR application 210 receives the decision and routes the customer's call to the unauthorized charges department.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable medium. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. An apparatus, comprising:
   at least one processor; and
   memory storing computer-readable instructions that, when executed by the at least one processor, cause the apparatus to:
   receive user credentials;
   retrieve user information based on the user credentials;
   analyze the user information;
   determine a first business rule to retrieve;
   retrieve the first business rule;
   analyze information contained in the first business rule;
   receive a first decision based on the information in the first business rule, wherein the first decision is to retrieve a second business rule;
   retrieve a second business rule;
   analyze the information contained in the second business rule;
   receive a second decision based on the information in the second business rule; and
   manage a call in an interactive voice response system based on the second decision,
   wherein the first business rule changes dynamically based on a duration of time of the call in the interactive voice response system.

2. The apparatus of claim 1, wherein managing a call in an interactive voice response system includes:
   determining a message to be played to a user; and
   playing the message to the user.

3. The apparatus of claim 2, wherein the message played to the user includes an interactive menu.

4. The apparatus of claim 1, wherein managing a call in an interactive voice response system includes:
   determining procedures for routing the call in the interactive voice response system.

5. The apparatus of claim 4, wherein determining the procedures for routing the call in the interactive voice response system includes at least one of:
   prioritizing the call;
   determining where to route the call; and
   determining a wait time for the call.

6. The apparatus of claim 1, wherein the memory stores additional computer-readable instructions that, when executed by the at least one processor, further cause the apparatus to:
   receive notification that the user information has changed;
   re-retrieve the second business rule;
   re-analyze information contained in the second business rule;
   receive a third decision based on the information in the second business rule; and
   manage a call in an interactive voice response system based on the third decision.

7. A method, comprising:
   receiving user credentials at an interactive voice response application;
   retrieving, at the interactive voice response application, user information based on the user credentials;
   analyzing, at the interactive voice response application, the user information;
   determining, at the interactive voice response application, a first business rule to retrieve based on the user information;
   retrieving, at a decision tree application, the first business rule;
   analyzing, at the decision tree application, information contained in the first business rule;
   receiving, at the interactive voice response application a first decision from the decision tree application based on the information contained in the first business rule;
   determining, at the decision tree application, a second business rule to retrieve based on the first decision;
   retrieving, at the decision tree application, the second business rule;
   analyzing, at the decision tree application, information contained in the second business rule;
   receiving, at the interactive voice response application, a second decision based on the information in the second business rule;
   based on the second decision, managing a call at the interactive voice response application;
   receiving, at the decision tree application, notification that the user information has updated;
   re-analyzing, at the decision tree application, the second business rule;
   receiving, at the interactive voice response application, a third decision based on the information in the second business rule; and
   managing a call in the interactive voice response application based on the third decision.

8. The method of claim 7, wherein managing a call at the interactive voice response application includes:
   determining a message to be played to a user; and
   playing the message to the user.

9. The method of claim 8, wherein the message played to the user includes an interactive menu.

10. The method of claim 7, wherein managing a call at the interactive voice response application includes:
    determining procedures for routing the call in the interactive voice response application.

11. The method of claim 10, wherein determining the procedures for routing the call in the interactive voice response application includes at least one of:
    prioritizing the call;
    determining where to route the call; and
    determining a wait time for the call.

12. At least one non-transitory computer-readable medium having computer-executable instructions stored thereon that, when executed, cause at least one computing device to:
- receive user credentials;
- retrieve user information based on the user credentials;
- analyze the user information;
- determine a first business rule to retrieve;
- retrieve the first business rule;
- analyze information contained in the first business rule;
- receive a first decision based on the information in the first business rule;
- determine a second business rule to retrieve based on the first decision;
- retrieve the second business rule;
- analyze information contained in the second business rule;
- receive a second decision based on the information in the second business rule;
- receive notification that the user information has updated;
- re-analyze the second business rule;
- receive a third decision based on the information in the second business rule; and
- manage a call in an interactive voice response system based on the third decision.

13. The at least one non-transitory computer-readable medium of claim 12, wherein managing a call at the interactive voice response system includes:
- determining a message to be played to a user; and
- playing the message to the user.

14. The at least one non-transitory computer-readable medium of claim 13, wherein the message played to the user includes an interactive menu.

15. The at least one non-transitory computer-readable medium of claim 12, wherein managing a call in an interactive voice response system includes:
- determining procedures for routing the call in the interactive voice response system.

16. The at least one non-transitory computer-readable medium of claim 15, wherein determining the procedures for routing the call in the interactive voice response system includes at least one of:
- prioritizing the call;
- determining where to route the call; and
- determining a wait time for the call.

17. The at least one non-transitory computer-readable medium of claim 12, wherein the first business rule is selected from a plurality of business rules.

18. The at least one non-transitory computer-readable medium of claim 12, wherein one of the first business rule or second business rule is re-analyzed based on an update in the user information.

* * * * *